Feb. 3, 1959  J. F. ROBB ET AL  2,872,007
TICKET DISPENSING PARKING METER
Filed Dec. 29, 1952  7 Sheets-Sheet 1
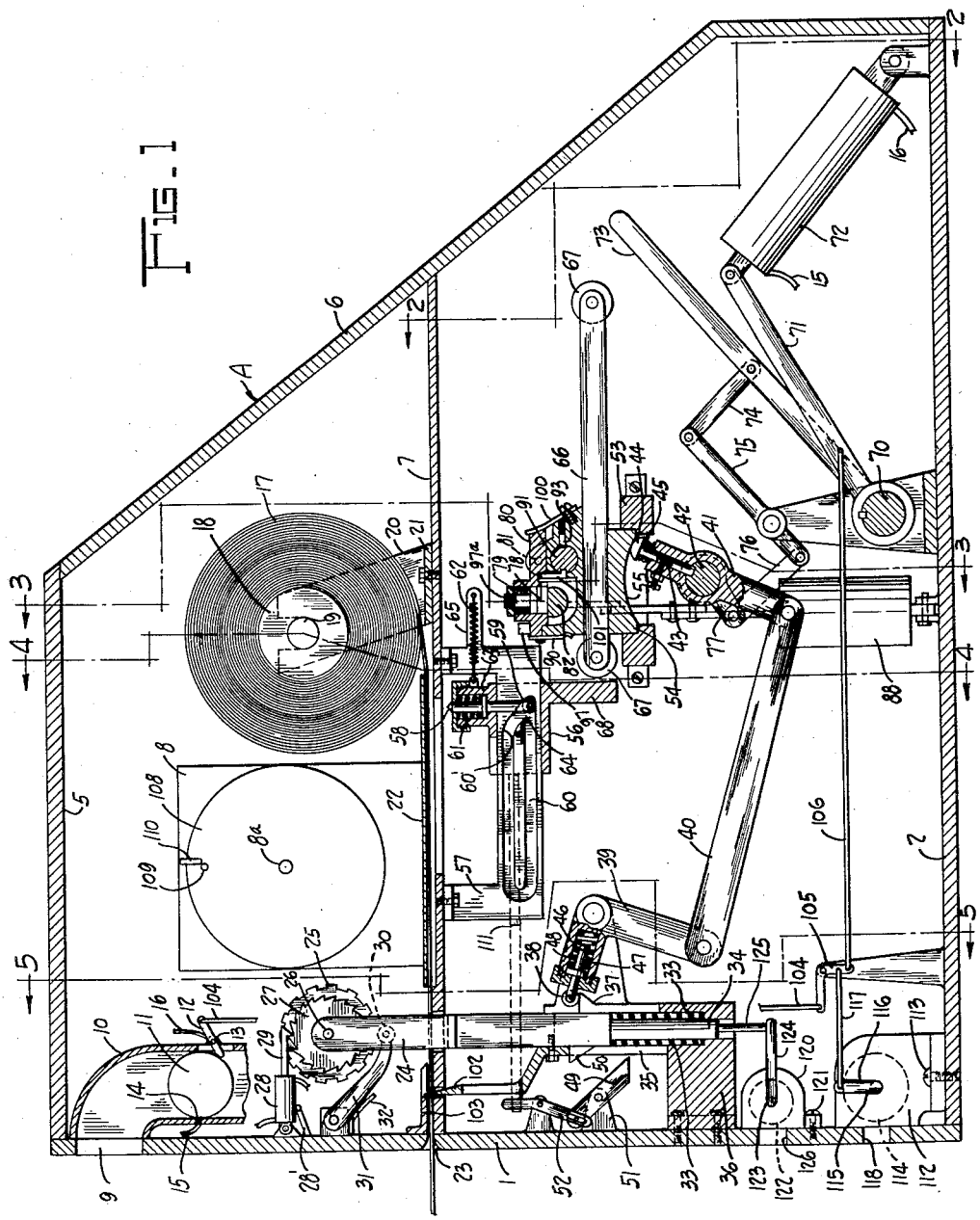
INVENTORS
J. F. Robb
F. B. Robb
BY
Robb & Robb
Attorneys

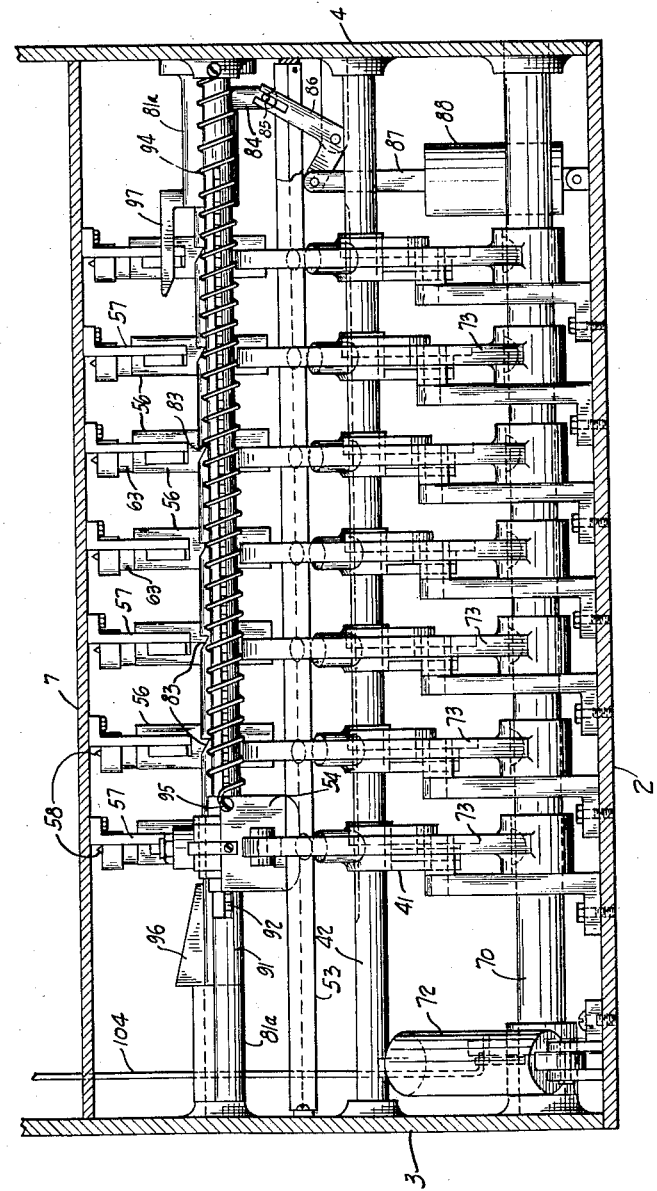

Feb. 3, 1959  J. F. ROBB ET AL  2,872,007
TICKET DISPENSING PARKING METER
Filed Dec. 29, 1952  7 Sheets-Sheet 3

INVENTORS
J. F. Robb
BY J. B. Robb
Robb & Robb
Attorneys

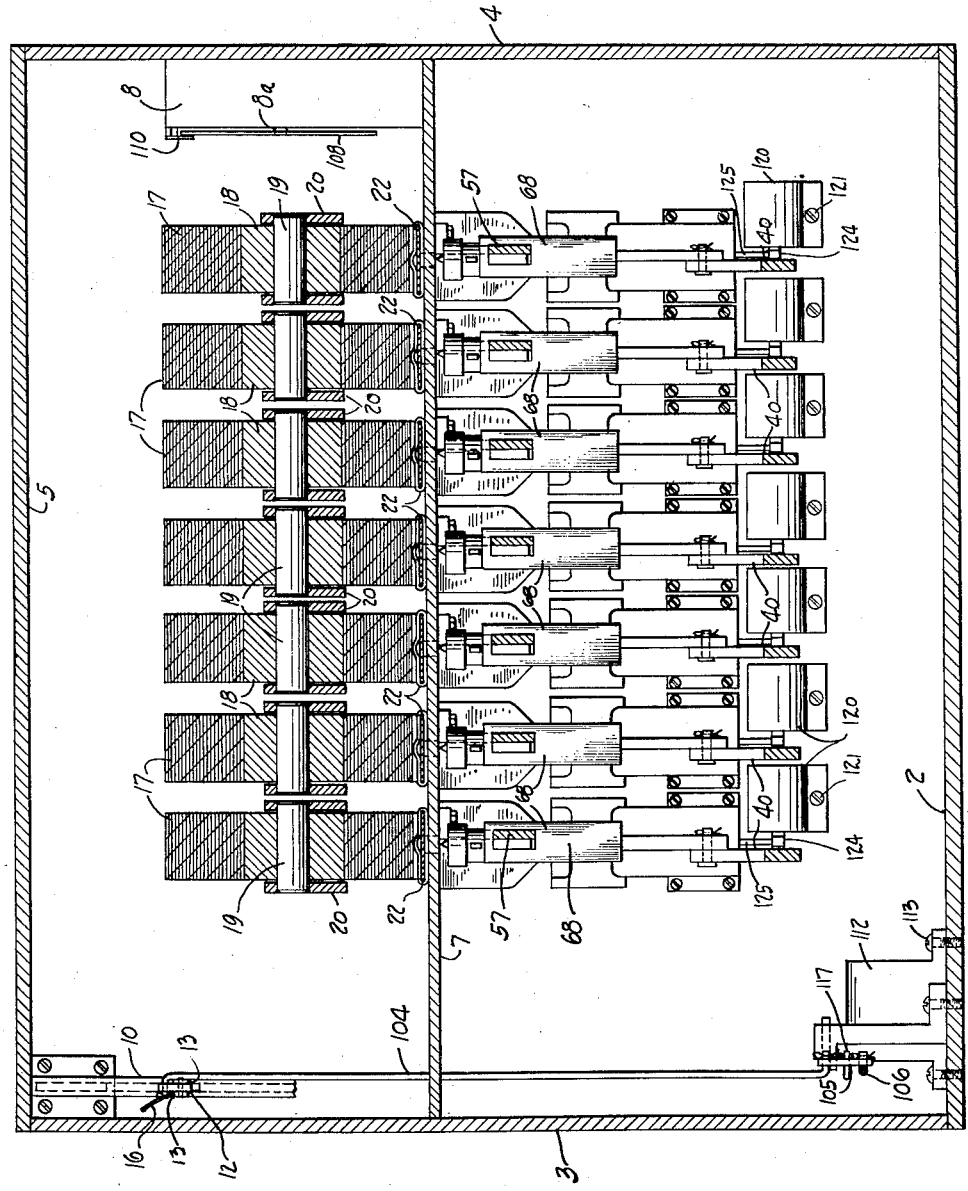

Feb. 3, 1959  J. F. ROBB ET AL  2,872,007
TICKET DISPENSING PARKING METER
Filed Dec. 29, 1952  7 Sheets-Sheet 5

INVENTORS
J. F. Robb
BY F. B. Robb
Robbs & Robbs
Attorneys

Feb. 3, 1959  J. F. ROBB ET AL  2,872,007
TICKET DISPENSING PARKING METER
Filed Dec. 29, 1952  7 Sheets-Sheet 6
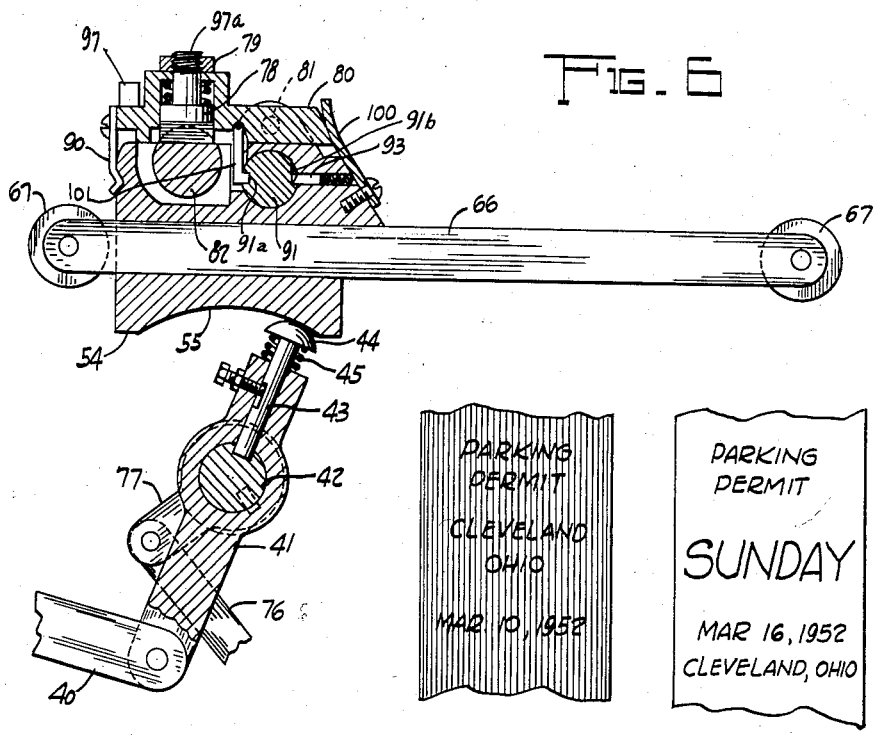
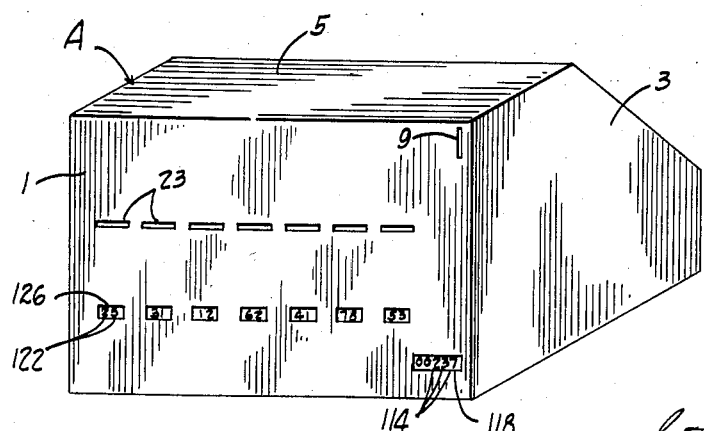

United States Patent Office 2,872,007
Patented Feb. 3, 1959

2,872,007

TICKET DISPENSING PARKING METER

John F. Robb, Cleveland Heights, and Frank B. Robb, Mayfield Heights, Ohio, assignors to James W. Menhall, Benton, Ill.

Application December 29, 1952, Serial No. 328,474

10 Claims. (Cl. 194—7)

The present invention pertains to improvements in parking meters, which as largely used today are employed for timing the use of street curb sections allotted by municipalities for automobile parking purposes and are controlled or operated by insertion of a coin of a value related to the period of desired use of the parking space. Meters of the above type include a signal (usually red) which is moved to a visible position on expiry of the purchased period of parking time, and are invisible while the meter is in operation after deposit of the coin starting such operation.

This invention has for its primary object, the provision of a new type of parking meter designed for multi-party use, primarily where day (twenty-four hour) parking periods, for instance, are to be controlled by the meter, so as to eliminate the need of supplying a meter for each parking space or section at the curb of the street. That is to say, the invention contemplates the location of this novel meter, in one of its uses, say at the end of a block, and provisions whereby the meter may dispense "Parking Permit" tickets for occupancy of any one of unoccupied parking sections or spaces of a plurality of spaces, along such block, by a person driving up and desiring to park his automobile at any available open space.

It is further contemplated, in carrying out this invention, that the tickets dispensed by the meter shall be dated as the meter feeds each ticket to the party parking, on the deposit in the meter of the required coin. Such ticket will be taken by the person parking his car and placed in the car in a position readily visible as on the inside of the windshield, or a window of the car, so as to be indicative of the issuance of a permit for use of the selected parking space to which the person parking will drive on receiving such ticket. Thus, the policing of the legal use of the parking spaces is facilitated.

Since according to the invention, the meter is to supply "Parking Permit" tickets dated properly as of the date issued, suitable novel provisions are made in the meter mechanism for changing the dating mechanism of the meter at the end of each twenty-four hours.

In order to avoid confusion and enable the tickets issued by the meter one day to be readily distinguishable from those issued a previous day, the meter of this invention preferably comprises a series of seven ticket dispensing units (one for each day of the week) each to hold a roll of paper tickets severable individually as dispensed, and the rolls for different days being differently colored. Thus, the tickets dispensed on Monday will be of a different color from those issuing from the machine on Sunday, further enabling those policing the use of the meter to quickly determine whether the ticket found on a car is one freshly issued for the day or period of its use, without the need for always consulting the date on the ticket as posted in the car parked. Such date, however, is always available for detail inspection whenever a policing officer desires to consult the same.

In view of the desirable employment of tickets of different colors for different days this invention involves the use in the mechanism of the meter, of an automatic day ticket selector, which at the end of the predetermined permitted period of parking, will be moved to a position for controlling the operation of the ticket dispensing unit to be rendered operative for issuing tickets for the next day's parking. Likewise, as a feature of the day ticket selector mechanism, instrumentalities are provided whereby at the end of seven days (a week period), the day selector is shifted from its position for operation of the Saturday ticket dispensing unit, back to its starting position at which it is located for rendering the Sunday ticket dispensing unit operative under coin deposit control of course.

While according to the embodiment of the invention herein illustrated, the meter is largely electrically controlled, and includes preferably an electrically operated clock, it is within the purview of the invention to employ manually wound up clock mechanism, along with other manually operated parts for operating certain adjuncts of the mechanism. In such preferred embodiment, the main ticket dispensing operation of this meter invention is controlled by utilizing the coin deposited as a circuit closer for initiating such operation by electro-motive force. But if desired, where electricity is not available, known expedients of the are such as means for unlocking the meter for operation by the deposited coin, and manual operating means for the automatically positioned day selector, may be resorted to. However, since the meter of this invention is especially intended for use in large towns and cities where electric current is always available to be supplied to the meter, the above construction employing electric operating means may readily be used.

The ticket dispensing units each include not only a holder for the roll of day tickets, but also a suitable feed mechanism for each roll comprising a feed member operable to engage the ticket material or tape and feed from the machine an individual ticket section on each coin insertion. Working with each said unit is a suitable knife for severing the ticket section from the roll as the feed movement ends, and the feed member is retracted for its next operation.

The various mechanical devices for the means above outlined are coordinated to operate in proper timed relations for the complete operation of the machine.

A meter of this invention may be advantageously employed in apartment house districts of cities, where limited parking facilities are available to tenants and parking on adjacent streets is necessary. Also, as respects parking lots in which long periods of parking are to be charged for, the present invention is useful and enables elimination of constant supervision of the lot, as well as affording a protection against loss of parking fees oft-times surreptitiously retained by attendants.

While the separate day ticket dispensing units may be used with differently colored rolls of tickets, the color distinction may be eliminated by employing rolls of tickets printed with the day of the week, such as "Sunday," "Monday," etc. in fairly large and easily visible type. The day indicia just noted may be quite adequate as regards ready policing of the issued tickets.

This invention also includes other detail features of construction required for establishing necessary cooperative actions of the various units, and associated mechanical parts, as will be described more fully later herein, and which are illustrated in the accompanying drawings.

In the annexed drawings:

Figure 1 is a vertical sectional view, taken through the housing of the machine and showing the general relation between the features of the ticket supply means, the printing mechanism for the printing of the date upon each ticket as it is dispensed, the selector mechanism for selecting for a particular day the appropriate ticket supply roll and printing instrumentalities for cooperation therewith, and the electric clock used as a part of the machine for control functions.

Figure 2 is a vertical sectional view, taken about on the line 2—2 of Figure 1, looking in the direction of the arrows.

Figure 3 is another vertical sectional view, taken about on the line 3—3 of Figure 1, looking in the direction of the arrows.

Figure 4 is a sectional view of the mechanism or certain features thereof as shown in Figure 1, and taken on the line 4—4 of Figure 1.

Figure 6 is a fragmentary enlarged view, showing more clearly the selector carriage and directly associated parts and also shown in Figure 1 in smaller illustration.

Figure 7 is a fragmentary view showing a portion of the ticket material or tape of one of the ticket rolls such as used when the ticket materials of the different ticket rolls are printed and supplied in different colors for the different days of the week.

Figure 8 is a view similar to Figure 7, but illustrating a special manner in which the ticket material of each of the ticket rolls may be printed, when the tickets are distinguished by printing thereon the particular day of the week, instead of using different colored material for the ticket rolls.

Figure 9 is a perspective view of the casing of the meter showing the coin slot, ticket slots, individual ticket counter dials, and main coin counter dial.

Figure 5:
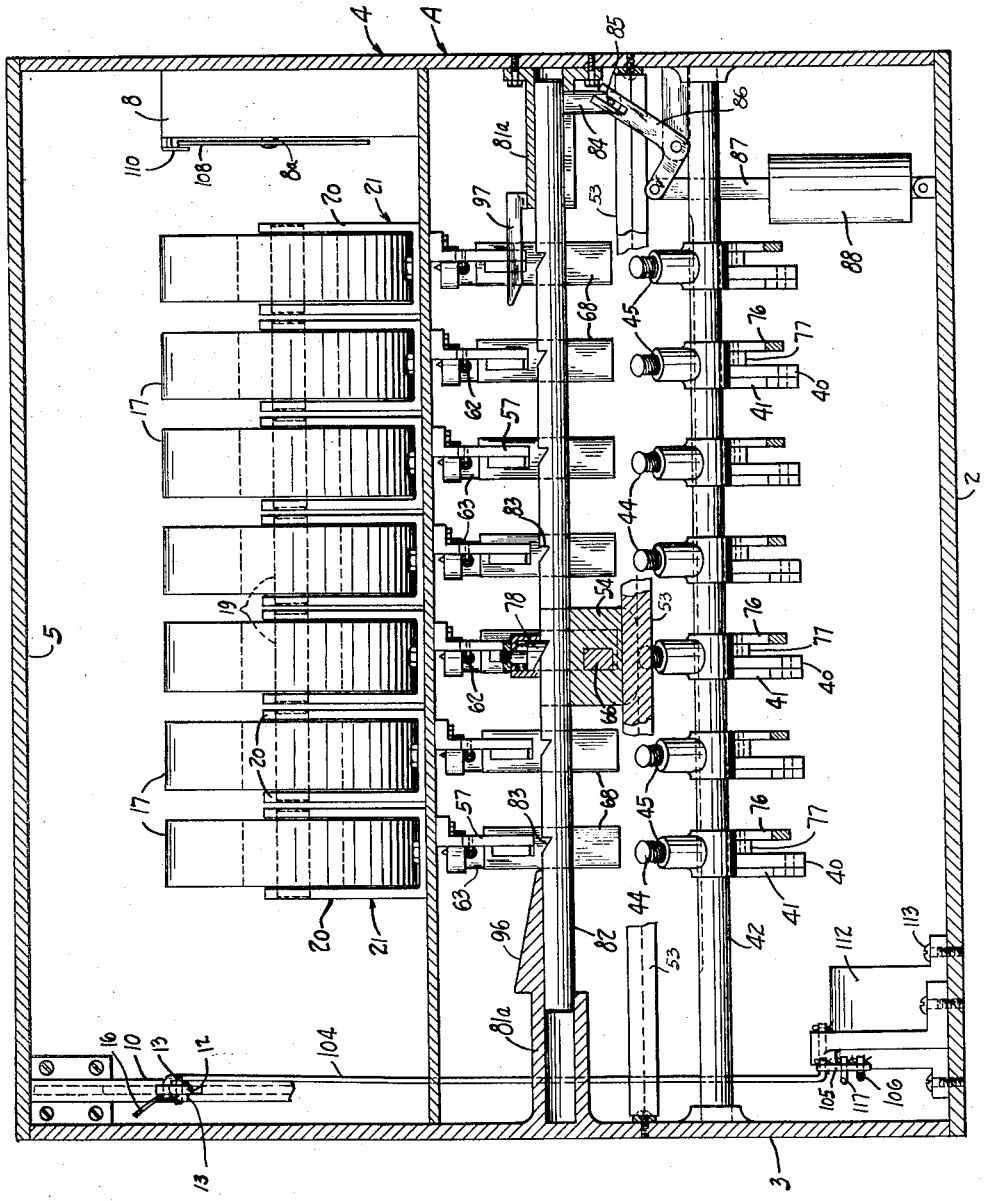
Figure 5 is still another sectional view, showing primarily the printing instrumentalities and taken on the line 5—5 of Figure 1, looking in the direction of the arrows.
Figure 5:
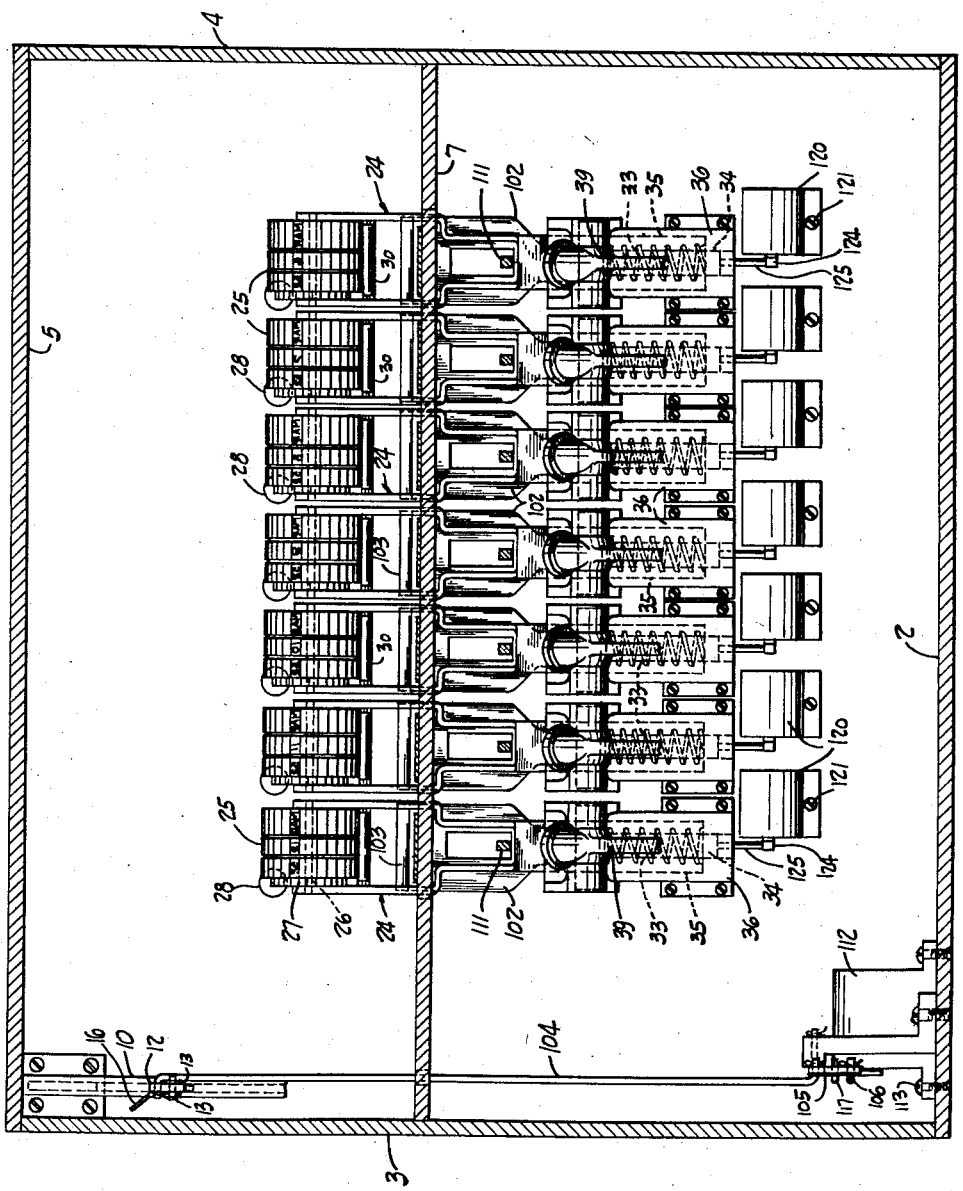
Figure 10:
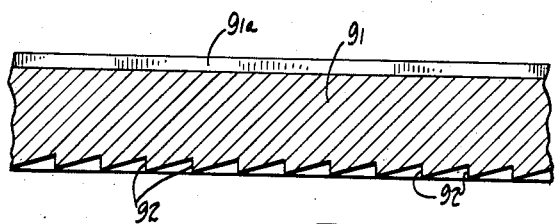
Figure 10 is a fragmentary sectional view of the detent shaft, on the line 10—10 of Figure 11.
Figure 11:
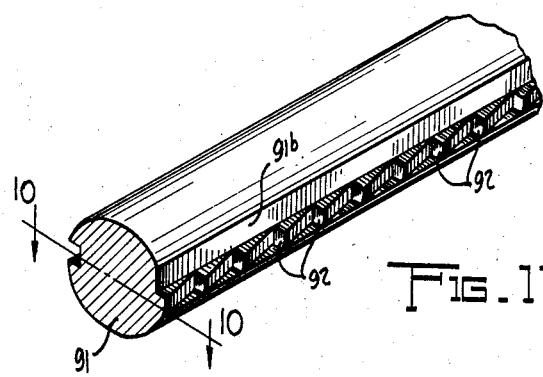
Figure 11 is a fragmentary perspective view of the detent shaft showing clearly the back travel path for the detent pin.
Figure 12:
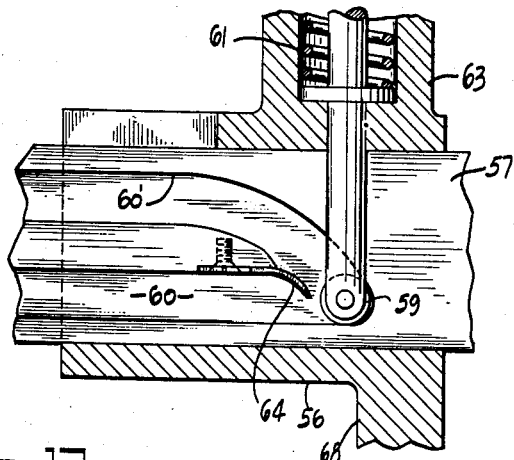
Figure 12 is a fragmentary view of ticket feed pin guide means on the frame supporting the pin carrier.

Referring to the accompanying drawings, it is notable that the machine of the present invention comprises the usual enclosure or housing which in the present instance includes the front plate or portion 1, the bottom or base plate 2, the sides 3 and 4, the top portion 5 and the rear or back portion 6 which slopes downwardly toward the bottom 2 of the housing.

In the housing which is generally designated as A for the purposes of this description, there is mounted a horizontal supporting plate 7, disposed slightly above a point midway between the top portion 5 and the base portion 2 of said housing. On this supporting plate 7 is mounted an electric clock 8, the function of which will appear more fully later in this description. At the top of the front plate 1 of the housing, and near the left side 3 thereof, is located a suitable coin slot 9, communicating with the coin chute 10, and a coin 11 is seen located in said chute as supported temporarily by means of a coin detent member 12, in the form of a small lever pivoted at 13 to a wall of the chute 10. At the outer portion of the chute and approximately opposite the detent 12, is located an electric contact 14 with which is connected a lead wire 15 of an electric circuit. Likewise, there is connected with the detent 12, another lead wire 16 of said circuit, and in the practice of the invention the coin shown at 11, when deposited in the chute 10 in the manner illustrated in Figure 1 of the drawings, is adapted to close the circuit which includes the wires 15 and 16 for purposes to be explained more fully later herein.

Ticket supply means

The parking tickets to be dispensed by means of the meter of this invention, are prepared in the form of rolls of ticket material, designated 17 and seven of these rolls of tickets are provided and are supported upon the supporting plate 7 as seen best in Figures 1 and 3 of the drawings. Each roll of ticket material is carried by a spool (see Figure 4), denoted 18, the spool having a mounting shaft member 19 and each shaft for supporting the spool being carried by the spaced sides 20 of a U-shaped bracket member 21. There are seven of the bracket members 21 suitably attached to the supporting member 7, for carrying the different rolls of ticket material 17.

From each ticket roll 17 the ticket material is fed forwardly toward the front 1 of the housing A, beneath a guide plate 22 and passes through an exit slot 23 at the front of the casing, one of these slots being provided for each of the rolls 17 of ticket material.

Ticket printing mechanism

The ticket printing mechanism used in this meter comprises a series of seven ticket printing units. Each of the printing units may be described as consisting of a vertically movable frame 24, which supports at its upper end between the sides thereof, a suitable series of dating wheels or printing wheels, designated as 25, mounted upon a short supporting shaft 26. Attached to the shaft 26 to turn therewith is a ratchet wheel 27 (see Figure 1 of the drawings) and also attached to said shaft 26 is the printing wheel 25, which prints the day of the month. In other words, the printing wheels 25 will bear indicia of the month, the day of the month, and the year, as for instance: "Mar. 3–52." By having the ratchet wheel 27 connected to the printing wheel 25 bearing the numeral of the day of the month, such as the numeral "3" above indicated, in the operation of the machine at the expiry of each 24 hours, as determined by the electric clock 8, a solenoid 28 (see Figure 1) may be energized so as to actuate the feed pawl 29, attached to the armature thereof, thereby to shift the said number wheel 25, one increment of its 31 increments of movement, and bring into position the number of the day succeeding that for which the wheel was previously adjusted. According to the disclosure herein, the shifting of the month indicating wheel and the year indicating wheel of the printing unit for each of the rolls 17, will be attended to manually at the end of a month, and at the end of a year respectively, so that if a month ends with 30 days, a manual operation will be performed to adjust the day printing wheel to the first day position thereof instead of depending upon the automatic action which normally continues throughout the month, of the electrically operated solenoid 28, and its pawl 29.

Continuing the description of the printing unit, it may be noted that any suitable means may be utilized for supplying to the indicia on the date wheels 25 ink for the printing impressions. As illustrated in Figure 1, for this purpose, an inking roller is movably mounted to travel beneath the wheels 25, and is of a width corresponding to the combined widths of the space occupied by the three date wheels 25. The roller 30 is carried by a depressable lever 31 normally biased in an upward direction by means of a spring 32, but adapted to yield downwardly as the printing frame 24 of a particular printing unit is moved downwardly to cause the impression of the date by its wheels 25 to be made upon the material of the ticket roll 17 with which the particular printing unit cooperates. In other words, it will be noted from Figure 1 and also Figure 5, that the ticket strip of material passes outwardly through the ticket slot 23 for each ticket roll by movement between the spaced sides of the frame 24 of each unit.

Now the frame 24 of each printing unit is adapted to move vertically through suitable slots or openings provided therefor in the supporting plate 7, the sides of the frame 24 extending upwardly through said slots, and the portion of the plate 7 between the sides of the frame 24 providing a supporting surface for the ticket material of each roll 17 when the printing wheels 25 are caused to move downwardly to impress the appropriate date for which they are set upon the ticket material.

As previously indicated, there is a printing unit or mechanism such as above set forth for each one of the ticket rolls 17, and additionally there are provided suitable operating devices for each one of said units. When the ticket material of a certain ticket roll 17 is to be dispensed for a period of a day's operation, the operating mechanism for the printing unit of such particular roll is rendered operative by suitable selector mechanism to be later described, and therefore the printing unit will work in conjunction with the dispensing of tickets by and from the said roll, during the period of operation of the machine when the roll is active or supplying or dispensing the tickets therefrom.

The actuating means for each printing unit includes a coiled spring 33 which cooperates with a stem 34 provided at the lower end of each frame 24 on a particular unit. The stem 34 works in a tubular guide portion 35, extending upwardly from a bracket arm 36 attached to the adjacent inside face of the front portion 1 of the housing A. Projecting inwardly from the lower end of the frame 24 of each printing unit, is a lug 37 with which the roller 38 on the upper arm of the bell crank lever 39 is adapted to engage. The spring 33 by expansion action and by bearing at its upper end against a shoulder portion near the lower end of the frame 24, tends to push the frame 24 upwards normally so that it will normally occupy the position illustrated in Figure 1 of the drawings. The lever 39 is connected by a link 40 attached at its lower end to a lever 41 supported midway of its ends on a counter shaft 42 which extends from one side of the housing A to the other side, being supported in suitable bearings in said sides of the housing. Said lever 41 is adapted to move with the shaft 42 under one condition, and also to remain stationary during movement of the shaft 42 under another condition. When the printing mechanism of a particular ticket roll is actively in operation for the regular day period of 24 hours, the lever 41 is clutched to the shaft 42 by means of a depressible clutch pin 43 having the cam head 44 between which head and the upper end of the lever 41 is located a coiled expansion spring 45. It will thus be seen that if the shaft 42 is rocked and the clutch pin 43 is depressed to the position of Figure 1, the lever 41 will be interlocked to the shaft 42 and the link 40 and the lever 39 will be actuated when the shaft 42 is rocked.

Now the roller 38 which is carried by the upper arm of the lever 39 is a yieldable roller, being supported by a yielding pin member 46, having a shoulder 47 thereon against which bears one end of a coiled expansion spring 48, housed in the hollow formation of said upper arm of the lever 39. Rocking movement of the lever 39 to carry the roller 38 downwardly while engaged with the upper surface of the lug 37, will move the frame 24 of the printing unit downwardly and carry the printing wheels in the same direction so that they may effect the impression of the date on the ticket material fed forward from the roll 17 as seen in Figure 1. When the frame 24 is lowered, a sufficient distance, a detent pawl lever 49 will engage an outstanding tooth 50, extending frontwardly from the frame 24 near its lower end, and the detent lever 49 will thus, for a predetermined time, be able to hold the frame 24 near the downward limit of its movement for a purpose to be set forth hereinafter. The lever 49 is pivoted to a bracket 51 on the inner surface of the front of the housing A, and is connected at its upper end with a trip lever 52 adapted to be impinged by a suitable member later to be set forth, in order to disengage the pawl lever 49 from the tooth 50 and permit the upward movement of the frame 24 of the printing unit to its normal upraised position.

*Mechanism for selecting ticket dispensing unit to be operated for a particular day*

The mechanism now to be described is seen best by reference to Figures 1, 2, 3 and 6 of the drawings, annexed hereto.

It will be understood that the selector unit of this mechanism is designed for the special purpose of progressively selecting the particular ticket dispensing unit and associated printing mechanism that is to be operated on each consecutive day of a week.

The selector mechanism, in other words, is designed to render operative the first day of the week, Sunday, the ticket roll dispensing means and dating mechanism for tickets severed therefrom which is to be used on Sunday as distinguished from other days of the week. Then at the end of the day period of Sunday, said selector mechanism will automatically under the control of the electric clock means employed (in the meter), operate to bring into action the dispensing mechanism and printing mechanism of the ticket roll that is to be used for Monday, the ticket material of which roll will be distinguished from that of the Sunday roll, as by the color of the material or by special indicia of the name of the day such as "Sunday," "Monday," "Tuesday," etc. largely printed thereon. The action of the selector mechanism is important because it is a main objective of the invention that the tickets dispensed by the meter hereof on one day shall be clearly distinguishable from those dispensed the previous day to render more easy the policing of the meter service, and reduce the possibility of persons who have obtained tickets on one day from using them on the next consecutive day of the week.

Having the foregoing in view therefore, and referring to the figures of the drawings last mentioned, it will be noted that extending from side to side in the housing A of the meter, is a supporting guide 53 in the upper recess side of which is supported the selector carriage 54. The carriage 54 is adapted to slide longitudinally of the guide member 53, the ends of which are attached to the sides of the meter housing, and said carriage is designed to be moved by a step-by-step movement taking place at the end of each day of the week from a position opposite the first roll 17 of ticket material as shown at the right end of the supporting plate 7 in Figures 3 and 4, until said carriage 54 at the end of the week, or on Saturday, will be opposite the ticket roll 17 at the left end of the group of rolls as seen in Figure 3, and also Figure 4. When the carriage 54 and associated mechanism thereof as will shortly be described, is opposite to a particular ticket dispensing roll 17 (and in this case the carriage will be beneath such roll) an operation of the meter by the coin deposited therein will effectuate the dispensing of a parking permit ticket from the meter housing at the slot 23 of such roll, which ticket will be printed with the date on which it is issued by the operation of the printing mechanism associated with the said roll. Feeding mechanism for feeding the strip of ticket material from the slot 23 is also susceptible of being energized as a part of the conjoint operation now being described by the adjustment of the selector unit, including the carriage 54 and its associated parts.

On the under side of the carriage 54, the latter is provided with a cam recess 55 and when the carriage 54 is positioned beneath and adjacent to a certain one of the ticket dispensing rolls 17, the cam 55 will be engaged with the head 44 of the clutch pin of the lever 41 which actuates the printing mechanism of said particular roll 17. The cooperation of the cam 55 with the clutch pin 43 is to depress the clutch pin so that its lower end engages in a longitudinal recess or slot formed in the shaft 42 at its upper portion. Thus, the positioning of the carriage 54 in association or opposite to one of the rolls 17 renders operative the printing mechanism of such roll.

There is provided for each of the rolls of ticket material 17 feed mechanism for feeding a section of the ticket material from the ticket issuing opening 23 when a coin is deposited in the meter for obtaining the permit ticket for parking. This feeding mechanism is seen best in Figure 1, as comprising a horizontal sleeve-like carrier 56, mounted to slide on a guide frame 57, attached to the under side of the supporting plate 7. The carrier 56 has mounted thereon a vertically movable feed pin 58 terminating at its upper end in one or more penetrating points adapted to engage the strip material supplied from the ticket roll 17, said pin 58 being adapted to be moved reciprocally toward and from the front 1 of the housing A. On its outward or frontward movement with the carrier 56, a roller on the lower end of the pin 58, designated 59 will travel in the upper lap of an endless horizontal slot 60, in the horizontal portion of the depending frame 57 that supports the carrier 56 and in fact passes through the hollow portion of said carrier. The right end of the upper lap of the slot 60 designated 60' is curved to provide a cam portion so that when the carrier 56 rides toward the front 1 of the housing A on the frame 57, the roller 59 and the pin 58 will rise on the curve of said cam portion 60' and thus cause the penetrating point at the upper end of the pin 58 to penetrate the material of the ticket roll 17 being dispensed. Thereupon after the penetration of said material the outward or forward movement of the feed pin 58 will feed a section of the ticket material equivalent to a ticket length from the dispensing slot 23 provided for such material. When the pin 58 reaches the outer limit of the slot 60, a spring 61 in a small housing through which the upper end of the pin 58 passes, formed on the carrier 56, will push downwardly on the pin 58 and its roller 59. Thereupon as the carrier 56 is later pulled toward the rear side of the machine by means of the spring 62 attached to said small housing 63 in which the spring 61 is located, the roller 59 will travel in the lower lap of the slot 60 until it passes a lift spring 64 on the horizontal portion of the frame 57, which spring is a spring plate designed to cause the roller 59 to rise in the slot 60 when the movement of the carrier 56 is initiated in the direction of the front of the machine as previously described. The spring 62 is anchored at its rear end to an extension arm 65 formed integrally with the frame 57.

On the selector carriage 54, there is mounted for horizontal sliding movement, an actuating slide 66 equipped at its front and rear end with rollers 67. When the carriage 54 is positioned beneath or opposite one of the rolls 17 for dispensing the ticket material therefrom, the front roller 67 of the slide 66 will be adjacent to or opposite a depending arm 68 formed integrally with the carrier 56. Thus, with the carriage 54 so positioned, it will be apparent that should the slide 66 be moved toward the front of the machine when positioned opposite the arm 68 of the carrier 56, and longitudinal movement is imparted to the slide 66, the carrier 56 for feeding the ticket material through the slot 23 will be actuated in the manner previously described to move toward the front of the machine and feed a ticket section from the slot 23 ready to be grasped and removed from the meter after being severed by means to be later described.

Near and on the bottom of the housing A of the meter (see Figures 1 and 2) is mounted a main actuator shaft 70, the same being supported in bearings in the lower portions of the sides 3 and 4 of the meter housing, A. Said main actuator shaft 70 is adapted to be rocked by means of an arm 71 rigid therewith, and connected at its rear end (see Figure 1) to the plunger or member of the solenoid 72, which solenoid is included in the electric circuit, including the lead wires 15 and 16 shown in Figure 1 at the coin chute 10.

Also on the shaft 70 and rigidly connected thereto to rock therewith, are 7 main actuating arms 73, one for each of the ticket dispensing rolls 17, and associated mechanisms, for such rolls. When the selector carriage 54 is opposite a certain roll, its actuating slide 66 will be disposed opposite the arm 73 which is opposite that particular roll 17 of the ticket material.

It may be noted here that the positioning of the selector carriage 54 opposite one of the rolls 17 for controlling the operation of ticket dispensing from said roll, locates the carriage so that the printing mechanism for such roll is rendered operative by the depression of the clutch pin 43 to clutch the lever 41 to the shaft 42; at the same time the feed means for feeding the ticket material from the slot 23 is rendered operative because slide 66 is disposed so that its front roller is opposite the arm 68 of the feed pin carrier 56; also the roller 67 at the rear end of the actuating slide 66 is positioned opposite to a main actuating arm 73 on the main shaft 70; which arm is that which will cooperate for handling the dispensing of the tickets from said particular roll 17 when a coin is deposited in the chute 10. It is this coin which will close the circuit, including the circuit wires 15 and 16 and the solenoid 72 so that the solenoid 72 will move the arm 71 upwardly, simultaneously move all of the actuating arms 73 counter-clockwise as seen in Figure 1, at the same time actuating a link 74, lever 75 and link 76. The link 76 is connected to a rocker arm 77 integral with lever 41 on the rock shaft 42 or counter shaft, as previously identified, which is the shaft which actuates the printing mechanism and certain other adjuncts thereto.

It remains to be described how the selector carriage 54 is operated to move the same to a position for coaction with the material of a particular roll 17, and the feeding, printing and severing instrumentalities for such material operated in the action of the machine to dispense a parking permit ticket from the roll aforesaid.

On the selector carriage 54 at the top portion thereof, is mounted a downwardly spring pressed feed dog 78. The spring normally tending to move said dog downwardly, is designated 79, and the dog is supported on an arm 80 pivoted to the top portion of the carriage 54 at 81. (See Figures 1 and 6.)

On the sides of the meter housing A, is a reciprocably movable selector rod 82, extending transversely across the carriage 54, in a recess in the upper portion of the carriage, and supported at its opposite ends in suitable bearings 81a. The selector rod 82 is provided in its upper side with seven notches 83 in each of which notches the feed dog 78 is successively adapted to enter or engage, each notch having an abrupt wall at its right end. Projecting downwardly from the right-hand end of the selector rod 82, as seen in Figure 1, is an arm 84, having a side pin 85 which enters a bifurcation in the upper end of a bell crank lever 86, pivotally supported on the adjacent side of the meter housing A. The lower end or arm of the lever 86 is connected pivotally to the armature member 87 of a solenoid 88 which is adapted to be energized under the control of the electric clock 8, at the end of each 24 hour so-called day period. Thus, when the solenoid 88 is energized momentarily, there will be imparted by said solenoid as to the selector rod 82, a leftward movement as seen in Figure 3 of the drawings. The restoring rightward movement of the rod takes place upon de-energization of the solenoid by spring means (not shown) in the body thereof as is conventional. Thus, in reference to Figure 3 wherein the carriage 54 is adjusted to a position for cooperation with the Thursday day ticket roll 17, when at the end of 24 hours the clock 8 energizes the solenoid 88, the leftward movement of the selector rod 82 thus caused will shift the rod a distance equal to the space between two of the notches 83, and by the cooperation of the notch 83 with the feed dog 78, the carriage 54 will be advanced or moved to a position opposite to the Friday day ticket dispensing roll 17, ready for the dispensing of ticket sections from said roll for the next 24 hours, according to one possible adjustment for use of the machine of this invention. Of course, when the carriage 54 shifts from the Thursday roll position to the Friday roll position, the cam portion 55 of the carriage relieves the pressure downwardly off the clutch pin 43 of the Thursday operating lever 41 thereby unlocking said lever from the shaft 42, and thereafter the carriage 54 in its new position cams down the clutch pin 43 of the Friday printing mechanism operating lever 41, setting said lever into interlocking connection with the shaft 42, ready to be operated by the latter incident to coin deposits in the chute 10.

It will be apparent that after the selector carriage 54 has been moved once each 24 hours, step-by-step from its position opposite the Sunday ticket roll 17 to the position opposite the Saturday ticket roll 17, it is required on the part of the mechanism of the meter that the carriage at the end of the Saturday ticket dispensing period shall be restored to its position opposite the Sunday ticket roll for again starting the cycle of rendering operative the mechanisms associated with each roll for the daily dispensing of tickets for the next week.

As before stated, the feed dog 78 is mounted upon an arm 80 normally held in the position shown in Figure 1, by a spring 90. It should be pointed out that there is provided for the carriage 54, a guide and detent shaft 91. This shaft 91 is supported in suitable bearings on the inner faces of the opposite sides of the meter housing A, and passes through the selector carriage 54 as seen best in Figure 1. The detent shaft 91 is slightly rotatable and is provided with serrations or teeth 92 throughout nearly its entire length or at least the length of its portion along which the carriage 54 slides under the actuation of the selector rod 82. The carriage 54 has a spring-pressed detent pin 93 normally engaging the serrations or teeth on the detent shaft 91. The detent means 91, 92 and 93 are necessary in order to hold the carriage 54 against return movement from its position opposite the Saturday roll or all rolls except the Sunday roll, back to its position opposite the Sunday roll. This is due to the fact that a coiled spring 94 is connected at one end to the side 4 of the meter housing A and at its opposite end to the carriage 54 at the point 95 (see Figure 2). This spring 94 is the return spring for returning the carriage 54 from its position opposite the Saturday ticket roll 17 to its position opposite the Sunday ticket roll 17; but during the operation of the meter from Sunday to the end of Saturday, the spring 94 is not effective to pull the carriage 54 back to its restored position opposite the Sunday roll 17, because of the action of the detent pin 93 on the serrated tooth rack 92 of the shaft 91. However, on the expiration of the 24-hour Saturday period of operation of ticket dispensing from the Saturday ticket roll 17, when the solenoid 88 is energized, the selector rod 82 is shifted sufficiently to the left, as seen in Figure 1, so that the front end of the arm 80 will strike a cam 96 on the left bearing member 81a for the rod 82, which cam will elevate the arm 80 at its front end to thereby lift said arm with the feed dog 78 out of engagement with the adjacent notch 83 of the selector rod 82. Immediately when this action occurs, the return spring 94 becomes effective to pull the carriage 54 back to its position opposite the Sunday roll 17, from its position wherein it was previously opposite the Saturday roll 17. As soon as the carriage 54 is restored to the last mentioned position opposite the Sunday roll 17, a cam 97 on the right-hand bearing 81a for the selector rod 82 will strike the upper side of the front end of the dog carrying arm 80, and restore the arm to its original position, as shown in full lines in Figure 1, wherein the dog 78 is re-engaged with the selector rod 82 at what may be called the Sunday ticket roll notch of the latter.

When the arm 80 is raised at its front end from the carriage 54 to thereby raise the dog 78 carried by said arm, it will be maintained temporarily in such position by the pressure action of a spring 100 on the adjacent end surface of the arm 80. When the arm 80 is in its normal horizontal position, it is assisted in maintaining such position by the use of the detent spring 90, cooperating with a notch on the front face of the carriage 54.

It should be noted that the reason the carriage 54 is enabled to be returned to its normal weekly starting position opposite the Sunday roll 17, at the time the cam 96 raises the front end of the dog carrying arm 80, is due to the fact that the detent shaft 91 is given a partial rotation by the raising movement of the front end of said arm 80. Such raising movement acts to pull upwardly upon a dog 101 which depends from the middle portion of the arm 80 and engages in a longitudinal groove 91a in the surface of the shaft 91. Thus, as the front end of the arm 80 is elevated, the dog 101 is raised imparting a slight turning movement to the guide and detent shaft 91 sufficient to turn the latter slightly until the teeth 92 thereof move rotatably a distance sufficient to disengage from the detent pin 93, said pin then engaging and riding on the flat 91b of the shaft 91. This renders the detent means 93 for holding the carriage 54 in its position against return action by the spring 94 inoperative momentarily when the carriage 54 has to be restored to its starting position for weekly operation of the meter, namely opposite the Sunday ticket roll 17.

Ticket severing device

By reference to Figure 1 of the drawings, it will be observed that the frame 24 of each of the printing units for the ticket rolls 17, carries somewhat spaced from the front side thereof a vertical knife or blade 102. This knife 102 passes upwardly through a slot in the supporting plate 7 adjacent to a shear plate 103 mounted above said plate 7. The ticket material passing from the roll 17 passes between the plate 103 and the plate 7 as it issues from the ticket slot 23. Thus, when the frame 24 of each printing unit rises in its restoring movement to normal position, the outermost section of the ticket material at the slot 23 will be severed so that the person who has deposited the coin in the meter for the permit ticket may readily withdraw the ticket from the slot 23 by his hand.

It is to be noted that the coin detent lever 12 arranged to engage the coin 11 in the chute 10 is connected by a rod 104 with a small bell crank lever 105 in turn connected by rod 106, to the rocker arm 71 operated by the solenoid 72. Thus, the movement of the arm 71 is adapted to raise the rod 104 and withdraw the detent member 12 from its position projecting into the coin chute, whereby the coin may be dropped into a suitable receptacle to be retained in the machine, whereafter the detent member 12 will be restored and ready to receive and support the next coin introduced into the machine which acts as a circuit closing means to effect automatic operation of ticket dispensing from one of the selected ticket rolls 17.

In order that the solenoid 28 which operates the dating wheel may not move downwardly, it is supported by a short arm 28'.

As to the clock 8, it is notable that the main shaft of this clock which will rotate completely once in 24 hours is designated 8a, and carries a disc 108 fixed for rotation therewith. The disc 108 carries a trip pin 109 adapted to strike a switch arm 110 by which the circuit including the solenoids 88 and 28 are energized.

Operation

A brief description of the cycle of operation of the meter is now given. When a coin such as designated 11, in Figure 1, is inserted in the chute 10, said coin will drop to the position illustrated in said figure, and will be supported by the detent member 12. The coin thus connects the adjacent terminals of the wires 15 and 16 of the electric circuit which includes the solenoid 72. The solenoid 72 is thereby energized and by action on the arm 71 starts to rock the shaft 70 in a counter-clockwise direction. The initial movement of the shaft 70 imparts movement to the arm 73 which is opposite the actuator slide 66, but does not immediately cooperate therewith. Instead, the movement of the arm 73 communicates movement through the link 74 and lever 75 to the rock shaft 42 which is locked to the lever 41 by the clutch pin 43 now held depressed by the carriage 54 in engagement with the cam head 44 thereon. The rocking of the shaft 42 through the link 40 and bell crank lever 39, causes an immediate downward movement of the frame 24 of the dating unit comprising the dating wheels 25. The date in this manner is impressed upon the portion of the ticket material beneath the dating wheels as the latter is pressed down upon the ticket material on the supporting plate 7.

As the frame 24 of the printing unit moves downwardly, the knife 102 is carried downwardly therewith and at a certain point in the downward movement of the frame 24, the roller 38 of the plunger 47 passes down below the lug 37 and escapes therefrom. The frame 24 does not immediately return to its upper limit of movement however, but moves slightly upward sufficiently to carry the dating wheels slightly above the ticket material about to be fed from the ticket slot or opening 23.

The frame 24 is held in this particular position of supporting of the dating wheels 25 by means of the lever pawl 49 engaging the tooth 50 near the lower portion of the frame 24.

When the above operations are completed, the rocker arm 73 engages with the roller 67 on the actuator slide 66 and the leftward movement of the arm 73 and slide 66 as seen in Figure 1, causes the slide 66 to push by its roller 67 against the arm 68 on the carrier 56 which supports the ticket feeding pin 58. The leftward movement of the carrier 56 toward the front of the machine, thus causes the pin 58 to rise in the cam slot 60, engage the strip of ticket material and feed a section of this material toward the front of the machine and partially out of the slot 23. The carrier 56 has a forwardly extending arm 111 which moves forwardly between the sides of the frame 24 as the carrier is shifted toward the front of the meter, and this arm 111 engages the trip lever 52 and disengages the lever pawl 49 from the tooth 50 on the frame 24 of the printing unit, thereby permitting the frame 24 to move quickly to its upward limit or position under the compulsion of the expanding force of the spring 33. The final action of the upward movement of the frame 24 carries the knife 102 upwardly along with it, and the knife severs the ticket section which has been previously dated and fed forward to the ticket dispensing slot 23.

From the previous description, it will be understood that the spring 62 connected with the carrier 56 will restore said carrier 56 to its normal position as of the showing in Figure 1, with the feeding pin 58 ready for another operation of feeding forward the ticket material for supplying another permit ticket for parking. Said spring 62 performs a dual function in that it not only restores the carrier 56 to its position in Figure 1, after its leftward operating movement above described, but also pushes rearwardly through the arm 68 of the carrier 56, on the slide 66 so as to restore said slide to its normal position of Figure 1, ready for another operation when a coin is subsequently introduced into the meter for obtaining another parking permit ticket.

As the rocker arm 71 reaches its forward limit of movement under actuation by the solenoid 72, through the action of the rods 106 and 104 and bell crank lever 105, the detent member 12 is momentarily withdrawn from the path of the coin in the chute 10, and said coin then drops to a suitable receptacle or to the interior of the housing A breaking the circuit between the terminal wires 15 and 16, and simultaneously de-energizing the solenoid 72 so the solenoid parts will return to their normal original positions.

At the end of the 24-hour so-called date period of dispensing from the Thursday ticket roll, as shown in Figure 3, the disc 108 of the clock 8 will assume the position substantially as shown in Figure 1, so that the pin 109 engages and operates the switch arm 110 closing the circuit including the solenoid 88, see Figure 3; also the solenoid 28, see Figure 1. Upon energizing of the solenoid 28, the armature operated pawl 29 will be withdrawn leftwardly in the solenoid, a distance equivalent to the length of one tooth on the ratchet wheel 27, and the date wheel having the numbers of the days of the month will be given one increment of movement to bring the new and consecutive date on the said wheel into operative position for printing of the ticket to be dispensed.

The energizing of the solenoid 88 causes actuation of the bell crank lever 86 to shift the selector rod 82 leftward as seen in Figure 3, so that the said rod 82 by coaction with the feed dog 78 will shift the carriage 54 to a position opposite the Friday ticket roll 17 which is the second roll from the lefthand end of the series of rolls illustrated in Figure 3. This shifting of the carriage 54 causes a release of the clutch pin 43 from the lever 41 of the Thursday ticket roll and an actuation of the clutch pin 43 to lock the lever 41 of the Friday ticket roll dispensing mechanism to the countershaft 42 for conditioning the several mechanisms of the Friday ticket roll operating parts for dispensing of the tickets, the printing of the same with the date, and the severing of the ticket section in the manner previously set forth.

It being assumed that in regular course, the carriage 54 has been advanced to its position opposite the Saturday ticket roll 17, and that the 24-hour period for dispensing of tickets from the latter roll has been completed, the solenoid 88 will be energized by the cooperation of the trip pin 109 with the switch arm 110 of the clock unit. The solenoid 88 thus energized, causes the leftward movement of the selector rod 82 as seen in Figure 3, and the front end of the arm 80 on the carriage 54 is engaged with the cam 96 and upraised to shift the feed dog 78 upwards out of engagement with the rod 82. Thereupon the spring 94 (see Figure 2) goes into play, and acts to bring the carriage 54 back from its position opposite to the Saturday ticket roll 17, to its position opposite the Sunday or first ticket roll 17, located at the rightmost position in Figure 3. When the carriage 54 resumes its position opposite the ticket roll 17 used for dispensing the tickets on Sunday, the cam 97 strikes the front end of the arm 80 and restores the dog 78 to its engagement with the selector rod 82, conditioning the meter mechanism for subsequent operation of the rod 82 to progressively shift each day the selector carriage 54 along the guide member 53 to its selected positions opposite the various ticket rolls 17. It will be understood of course, that when the left or front end of the arm 80 as seen in Figure 1, is raised, the lifting dog 101 partially rotates the detent and guideshaft 91 and disengages the detent pin 93 from the teeth 92 of said shaft 91 to permit the carriage to return under the actuation of the spring 94, at which time the pin 93 rides on the longitudinal flat 91b of shaft 91 during rightward traverse of the carriage 54.

The restoration of the arm 80 to its downward horizontal position by the cam 97, causes the dog 101 to likewise return said shaft to its position with the detent 93 acting to maintain the carriage 54 in its adjusted or selected position.

As a means for checking the operation of the meter and to assure that the collection of coins is properly made, a master counter of the well-known Veeder type is provided, and denoted 112 in Figure 1. This counter is mounted at the front lower part of the casing A, being fixed in position by a suitable screw 113. The usual dials 114 are mounted on a shaft 115 to which an arm 116 is fixed. The arm 116 is connected by a link 117 to one of the arms of the bell crank lever 105. Thus, when the lever 105 is rotated by the rod 106 and arm 71, the dials 114 of the counter are actuated. This takes place upon release of the coin from its position in the upper end of the chute 10, and thus records the number of coins which have been inserted in the slot 9 as will be apparent.

The dials 114 are visible from the front of the meter through a suitable opening 118 therein, which may be provided with a suitable transparent window.

A further check on the operation of the meter is provided by individual counters of similar type to that just described, which counters are indicated at 120 in Figure 1. These counters 120 are suitably supported on the wall 1 of the casing A by screws 121 and include dials 122 therein for actuation by a shaft 123. Although seven of these individual or ticket counters are provided, one for each ticket issuing unit, only one will be described, it being understood that the others are similarly formed and operated.

Each counter has fixed to its shaft 123, an arm 124 extending therefrom and normally biased toward a generally horizontal position by the mechanism of the counter, which is conventional and not shown in detail. The arm 124 extends to and beneath a downwardly extending push rod 125 which is suitably fastened at the lower end of the stem 34 of frame 24 which supports the printing wheels 25.

When the frame 24 moves downwardly, the rod 125 abuts the arm 124 and thus moves the dials 122 or one of them, as the case may be; the arm returning to its normal position when the ticket is severed from the strip.

Visibility of the numbers on the dials is provided by openings 126 in the front wall 1 of the casing A, which openings may also be furnished with suitable transparent coverings therefor.

Since each of the seven ticket actuating means is provided with a counter, it will be readily apparent that a quick check may be made of the number of tickets issued and a corresponding summary of the number of coins inserted will be available for reference and accounting purposes. Further, data will be available as to the use of the meter for individual days and a determination had of the requirement for replenishing the ticket rolls where required.

It will be understood that we do not wish to be limited to the specific details of construction of our parking meter as hereinbefore set forth. Obviously as regards the ticket dispensing units, there may be employed unit mechanisms which dispense precut tickets individually handled by the ticket feed device by ejection from a suitable hopper in which the tickets may be stored one above the other instead of dispensing the tickets from rolls. Likewise, if desired, within the scope of this invention, and the claims hereinafter appended, the main actuator may be manually operated after release by a deposited coin in lieu of operating the same by a coin released motor device as illustrated and herein described.

Other changes in the construction and operation of the detail features of the present meter, may be resorted to without departing from the spirit of our invention.

Having thus described our invention, what we claim as new and desire to secure by Letters Patent of the United States, is:

1. In a parking meter, in combination, a housing, a plurality of parking ticket dispensing units therein, an actuating device for each of said units, a main actuator comprising means for operating said actuating devices, and a selector unit operable to selectively render operative each of said devices by the main actuator, timing means to move the selector unit automatically to establish coaction of the selected actuating device and the main actuator, and means to move the main actuator, a date printing device and a ticket severing device coacting with each dispensing unit, for dating and cutting off respectively tickets dispensed thereby, and means to operate the printing and severing devices operable incident to operation of the selector unit upon operation of the main actuator.

2. In a ticket dispensing parking meter for supplying parking tickets for different identified periods of time, in combination, a plurality of ticket dispensing units each comprising a feeding device for ticket material, an actuating member common to all of said feeding devices, a selector carrying said actuating member, a main actuator having means to operate the said actuating member when positioned by the selector for co-action with any selected dispensing unit, mechanism for moving the selector automatically after a pre-determined period of time to carry the selector and its actuating member from a position cooperable with the feeding device of one dispensing unit to a position cooperable with the feeding device of an adjacent dispensing unit, a normally inactive date printing device combined with each dispensing unit for printing a date on the ticket dispensed by said unit, an operating means for each printing device, instrumentalities settable by positioning of the selector for co-action of its actuating member with a selected dispensing unit to render operative the printing device operating means, and parts connected with the main actuator operable to actuate the operating means for a selected printing device previously rendered operative when the main actuator is operated.

3. In a ticket dispensing parking meter for supplying parking tickets for different identified periods of time, in combination, a plurality of ticket dispensing units each comprising a feeding device for ticket material, an actuating member common to all of said feeding devices, a selector carrying said actuating member, a main actuator having means to operate the said actuating member when positioned by the selector for co-action with any selected dispensing unit, mechanism for moving the selector automatically after a pre-determined period of time to carry the selector and its actuating member from a position cooperable with the feeding device of one dispensing unit to a position cooperable with the feeding device of an adjacent dispensing unit, a normally inactive date printing device combined with each dispensing unit for printing a date on the ticket dispensed by said unit, an operating means for each printing device, instrumentalities settable by positioning of the selector for coaction of its actuating member with a selected dispensing unit to render operative the printing device operating means, and parts connected with the main actuator operable to actuate the operating means for a selected printing device previously rendered operative, when the main actuator is operated, means to detain the printing device near its printing position after its printing action, and release means for said detaining means operable by the feeding device of any selected dispensing unit on operation of the feeding device by the actuator.

4. In a parking meter for dispensing tickets to license parking through the days of consecutive weeks, in combination, a series of ticket dispensing units, one for each day of the week, a ticket feeding device for each unit, a main actuator comprising a shaft, operating arms on said shaft each to coact with one of the dispensing units, an automatic traveling selector comprising an actuating member adapted to coact with each of said feeding devices when moved by the selector to a position adjacent to such device, said actuating member when so positioned being in the path of movement of one of said operating arms, means to move the selector to a position in which its actuating member may operate any selected feeding device and be operated by a correspondingly selected operating arm of the shaft, the last moving means comprising a timing device operable at predetermined periods of time to effect a travel movement of the selector and its actuating member from a position coacting between one feeding device and the shaft operating arm therefor to a corresponding position between another feeding device and shaft operating arm therefor.

5. In a parking meter for dispensing tickets to license parking through the days of consecutive weeks, in combination, a series of ticket dispensing units, one for each day of the week, a ticket feeding device for each unit, a main actuator comprising a shaft, operating arms on said shaft each to coact with one of the dispensing units, an automatic traveling selector comprising an actuating member adapted to coact with each of said feeding devices when moved by the selector to a position adjacent to such device, said actuating member when so positioned being in the path of movement of one of said operating arms, means to move the selector to a position in which its actuating member may operate any selected feeding device and be operated by a correspondingly selected operating arm of the shaft, the last moving means comprising a timing device operable at predetermined periods of time to effect a travel movement of the selector and its actuating member from a position coacting between one feeding device and the shaft operating arm therefor to a corresponding position between another feeding device and shaft operating arm therefor, combined with a printing device for each dispensing unit, normally inoperative connecting means between each printing device and the main actuator for actuating the printing device from the latter, and clutch means operable by the selector to activate the said connecting means for the printing device of a dispensing unit whose feeding device is selected and rendered operable by the actuating member of the selector.

6. In a ticket dispensing parking meter for dispensing tickets of parking license on different days of the week, in combination, a series of ticket dispensing units, one for a parking period of each day of the week, each of said units comprising a ticket feeding device, automatic mechanism to render a ticket dispensing unit for Sunday, alone operative at the commencement of a week period, including instrumentalities to progressively render ticket dispensing units, one for Monday, Tuesday, Wednesday, Thursday, Friday and Saturday, individually operative on the commencement of the day parking periods thereof, main actuating means for the said units connectable by said instrumentalities to the feeding devices thereof, said instrumentalities comprising a selector rod adjacent to all of the dispensing units, a selector movable on said rod, an actuating member on the selector for operating the feeding device of an operative dispensing unit, from the main actuating means, means to shift the selector rod at the end of each day parking period to carry the selector and its actuating member to a position for rendering the dispensing unit of the next day parking period operative, and means to hold the selector in such position.

7. In a ticket dispensing parking meter for dispensing tickets of parking license on different days of the week, in combination, a series of ticket dispensing units, one for a parking period of each day of the week, each of said units comprising a ticket feeding device, automatic mechanism to render a ticket dispensing unit for Sunday, alone operative at the commencement of a week period, including instrumentalities to progressively render ticket dispensing units, one for Monday, Tuesday, Wednesday, Thursday, Friday, and Saturday, individually operative on the commencement of the day parking periods thereof, main actuating means for the said units connectable by said instrumentalities to the feeding devices thereof, said instrumentalities comprising a selector rod adjacent to all of the dispensing units, a selector movable on said rod, an actuating member on the selector for operating the feeding device of an operative dispensing unit, from the main actuating means, means to shift the selector rod at the end of each day parking period to carry the selector and its actuating member to a position for rendering the dispensing unit of the next day parking period operative, and means to hold the selector in such position, mechanism for inactivating the holding means last mentioned, at the end of the Saturday parking period, and means to return the selector to its Sunday dispensing unit cooperation when said holding means is inactivated.

8. In a ticket dispensing parking meter for dispensing tickets of parking license on different days of the week, in combination, a series of ticket dispensing units, one for a parking period of each day of the week, each of said units comprising a ticket feeding device, automatic mechanism to render a ticket dispensing unit for Sunday, alone operative at the commencement of a week period, including instrumentalities to progressively render ticket dispensing units, one for Monday, Tuesday, Wednesday, Thursday, Friday and Saturday, individually operative on the commencement of the day parking periods thereof, main actuating means for the said units connectable by said instrumentalities to the feeding devices thereof, said foregoing mechanism being combined with a printing device for each ticket dispensing unit for printing the particular parking period day on which it is rendered operative, mechanism for advancing the printing devices to a new date printing adjustment at the expiry of each day parking period, and means to render the printing device of a dispensing unit operable simultaneously with rendering of its dispensing unit operative; and in which the printing devices have connections connectible with the main actuating means to be operated thereby.

9. In a ticket dispensing parking meter for dispensing tickets of parking license on different days of the week, in combination, a series of ticket dispensing units, one for a parking period of each day of the week, each of said units comprising a ticket feeding device, automatic mechanism to render a ticket dispensing unit for Sunday, alone operative at the commencement of a week period, including instrumentalities to progressively render ticket dispensing units one for Monday, Tuesday, Wednesday, Thursday, Friday and Saturday, individually operative on the commencement of the day parking periods thereof, main actuating means for the said units connectable by said instrumentalities to the feeding devices thereof, said instrumentalities comprising a selector rod adjacent to all of the dispensing units, a selector movable on said rod, an actuating member on the selector for operating the feeding device of an operative dispensing unit, from the main actuating means, means to shift the selector rod at the end of each day parking period to carry the selector and its actuating member to a position for rendering the dispensing unit of the next day parking period operative, and means to hold the selector in such position, combined with a printing device for each dispensing unit to print the ticket dispensed thereby, normally inoperative connecting means between each of the printing devices and the main actuating means and clutch means coacting with each said connecting means operable by the selector when positioned to render a certain dispersing unit operative to condition the adjacent connecting means for operation by the main actuating means.

10. In a ticket dispensing parking meter for dispensing tickets of parking license on different days of the week, in combination, a series of ticket dispensing units, one for a parking period of each day of the week, each of said units comprising a ticket feeding device, automatic mechanism to render a ticket dispensing unit for Sunday, alone operative at the commencement of a week period, including instrumentalities to progressively render ticket dispensing units, one for Monday, Tuesday, Wednesday, Thursday, Friday and Saturday, individually operative on the commencement of the day parking periods thereof, main actuating means for the said units connectable by said instrumentalities to the feeding devices thereof, said foregoing mechanism being combined with printing devices having means to print the date of issue of a dispensed ticket coacting with each dispensing unit, one for each unit; and in which the automatic mechanism comprises a single selector common to all of the dispensing units, with means to move said selector into coaction position each day period with the ticket feeding device of a selected dispensing unit and its associated printing device, and connections between the printing device and the main actuating means including a clutch operable by the selector to activate the printing device for operation when said main actuating means is operated.

References Cited in the file of this patent

UNITED STATES PATENTS

| | | |
|---|---|---|
| 899,671 | Lebeis | Sept. 29, 1908 |
| 964,988 | Lundquist | July 19, 1910 |
| 983,045 | Gossman et al. | Jan. 31, 1911 |
| 1,007,049 | Barta | Oct. 31, 1911 |
| 1,027,797 | Bates | May 28, 1912 |
| 1,040,859 | Blair | Oct. 8, 1912 |
| 1,053,187 | Lissauer | Feb. 18, 1913 |
| 1,056,508 | Daniels | Mar. 18, 1913 |
| 1,098,913 | Magidson | June 2, 1914 |
| 1,128,518 | Rohland | Feb. 16, 1915 |
| 1,208,642 | Pitney | Dec. 12, 1916 |
| 1,265,725 | Banwell et al. | May 14, 1918 |
| 1,435,184 | Skerl | Nov. 14, 1922 |
| 1,734,283 | Baur et al. | Nov. 5, 1929 |
| 1,737,422 | Hulme | Nov. 26, 1929 |
| 1,761,529 | Long | June 3, 1930 |
| 1,784,585 | Eller | Dec. 9, 1930 |
| 1,949,541 | Hartman | Mar. 6, 1934 |
| 2,243,589 | Watling | May 27, 1941 |
| 2,361,662 | Spurlino et al. | Oct. 31, 1944 |

FOREIGN PATENTS

| | | |
|---|---|---|
| 609,076 | Germany | Feb. 11, 1935 |